United States Patent [19]

Okumura

[11] 4,138,077

[45] Feb. 6, 1979

[54] HELICOPTER-CARRIED RESCUE APPARATUS

[76] Inventor: Haruto Okumura, No. 1315, On-aza Shikatebukuro, Urawa, Saitama, Japan

[21] Appl. No.: 843,349

[22] Filed: Oct. 18, 1977

[51] Int. Cl.² .............................................. B64D 47/00
[52] U.S. Cl. ...................................... 244/118 P; 9/14; 43/12; 182/137; 244/137 P
[58] Field of Search ........... 244/137 R, 137 P, 118 R, 244/118 P, 138 R, 121, 1 R; 182/137, 2, 138, 139, 140; 9/14; 258/1.2; 43/12, 11, 7

[56] References Cited

U.S. PATENT DOCUMENTS

| 568,960 | 10/1896 | Shaw | 182/140 |
|---|---|---|---|
| 721,914 | 3/1903 | Palmer | 43/12 |
| 2,652,656 | 9/1953 | Glasser | 43/12 |
| 2,728,164 | 12/1955 | Mears | 43/7 |
| 3,036,315 | 5/1962 | Karnow | 43/12 |
| 3,421,165 | 1/1969 | Pugh | 9/14 |
| 3,712,567 | 1/1973 | Ruggeri | 244/137 R |
| 3,921,943 | 11/1975 | Munro et al. | 244/137 R |

FOREIGN PATENT DOCUMENTS

| 663467 | 5/1965 | Belgium | 244/137 R |
|---|---|---|---|
| 232782 | 12/1968 | U.S.S.R. | 9/14 |

Primary Examiner—Galen L. Barefoot
Attorney, Agent, or Firm—Haseltine, Lake & Waters

[57] ABSTRACT

A helicopter-carried rescue apparatus including a collapsible net assembly which is adapted to be carried in a fully collapsed condition when the helicopter equipped with the rescue apparatus is in cruise toward the scene of a disaster and which is fully expanded at the scene for being capable of picking up a number of endangered lives such as occupants of a building on fire, shipwreck survivors, survivors from ditched aircraft, flood victims, injured mountain climbers, lives in snow storms, etc. The net assembly can be automatically expanded and collapsed by remote control from the helicopter in flight or from any spot outside the helicopter and the net assembly and can further be moved between an upright position suitable for accommodating releaved survivors and a lying position suitable for being carried by the helicopter when the helicopter is rushing to a scene. The net assembly may be provided with floats if the rescue apparatus is utilized for the rescue works at sea.

29 Claims, 24 Drawing Figures

HELICOPTER-CARRIED RESCUE APPARATUS

The present invention relates to a lifesaving apparatus adapted to save lives at such sites that are difficult of prompt access by ships, boats or ordinary land vehicles. More particularly, the present invention is concerned with a helicopter-carried rescue apparatus which is operable as means to save shipwrecked survivors, survivors of ditched aircraft, flood victims, endangered occupants of buildings on fire, people and animals in snow storms, injured mountain climbers and so on.

Helicopters are frequently utilized to practice search and rescue works at seas, in mountains and at various other sites which are difficult of prompt access by ships, boats and ordinary land vehicles. Because, however, of the limited capabilities of conventional helicopter-carried lifesaving equipment, the search and rescue operations which can be conducted by helicopters suit search activities rather than rescue works at sites and, furthermore, the accommodation of a single piece of lifesaving equipment is limited to an extremely small number of people, say, a few persons at the most. When, on the other hand, a helicopter is in operation to rescue endangered occupants of a building on fire or mountain climbers in impending danger, the helicopter is often subjected to turbulent ascending currents of air above the building or to anabatic and katabatic winds blowing above the site in the mountain. Due to such irregular movements of air, the helicopter attempting to pick up the endangered people is compelled to stay aloft or could not approach the scene withoutout running the danger of crashing. In spite of these problems encountered in lifesaving operations to be conducted by helicopters, there is presently known no other means than a helicopter which is capable of promptly arriving at the scene of a disaster such as a skyscraping building on fire, of a ship or aircraft in distress and a mountain accident and picking up the endangered people from the air above the scene.

It is, accordingly, a prime object of the present invention to provide a new and useful helicopter-carried rescue apparatus which is capable of accommodating a great number of endangered people at a time and which can be maneuvered from a helicopter hovering or moving at a sufficiently high elevation at which the helicopter is free from the influence of irregular currents of air above the scene of a disaster.

Another object of the present invention is to provide a new and useful helicopter-carried rescue apparatus which can be hauled in a stable condition by a helicopter especially on the way to the scene of a disaster and which can be easily and with certainty maneuvered into a condition operable to accommodate endangered lives at the scene.

Still another object of the present invention is to provide a new and useful helicopter-carried rescue apparatus which is capable of safely accommodating the relieved survivors therein throughout the flight of the helicopter on the way back from the site of a disaster.

It is, yet, another object of the present invention to provide a new and useful helicopter-carried rescue apparatus which can be installed practically on any existing type of helicopter by making minor modifications in the helicopter and which is economical to manufacture and to maintain.

In accordance with the present invention, these objects are accomplished in a helicopter-carried rescue apparatus which comprises first and second axial ends and being biased to have its own weight to an upright position having the above mentioned axis in a vertical direction and the first and second axial ends at the upper and lower ends, respectively, of the net assembly. The net assembly includes a flexible net and a collapsible frame structure having the net fitted thereto and collapsible about the axis thereof between a fully collapsed condition having the net folded about the axis and a fully expanded condition having the net spread out about the axis. The net when spread out has a portion stretched on a plane substantially perpendicular to the axis of the net assembly and close to the above mentioned second axial end of the net assembly. Also present is a hoisting system including a lifting mechanism for installation on a helicopter and at least one flexible hoisting line fastened at one end to the lifting mechanism and at the other end to the net assembly being capable of suspending the net assembly in the aforesaid upright position below the helicopter in flight, wherein the frame structure comprises a support member located in the neighborhood of the upper end of the net assembly, substantially perpendicular to the axis of the net assembly and having an axis substantially coincident with the axis of the net assembly, a plurality of main ribs which are pivotally connected each at one end to the support member and which extend radially outwardly from the support member away from the upper end of the net assembly, the individual main ribs being pivotable around the axis of the net assembly between first angular positions closest to the axis of the net assembly and second angular positions remotest from the axis of the net assembly, the frame structure being in the fully collapsed condition thereof when the main ribs are in the above mentioned first angular positions and in the fully expanded condition when the main ribs are in the above mentioned second angular positions, an elongated, externally threaded screw rod which is rotatable about a center axis substantially coincident with the axis of the net assembly and which extends away from the above mentioned support member toward the second axial end of the net assembly, the screw rod having a leading end at a predetermined distance from the second axial end of the net assembly, an internally threaded guide member which is in mesh with the externally threaded screw rod and which is movable on the screw rod in opposite directions parallel with the center axis of the screw rod as the screw rod is rotated in opposite directions about the center axis thereof, control ribs extending radially outwardly from the guide member and each pivotally connected at one end to the guide member and at the other end to an intermediate portion of each of the above mentioned main ribs, the individual control ribs being pivotable around the axis of the net assembly between first angular positions closes to the axis of the net assembly and second angular positions remotest from the axis of the net assembly and being in the first angular positions when the guide member is in a position closes to the aforesaid leading end of the screw rod and in the second angular positions when the guide member is in a position remotest from the leading end of the screw rod, and drive means mounted on the above mentioned support member and operatively connected to the screw rod, the drive means being operative to drive the screw rod to rotate in either direction about the center axis of the rod and accordingly drive the guide member to move in either direction along the screw rod. The main and control ribs thus forming part of the frame structure are preferably arranged substantially symmetrically with respect to the axis of the net assembly. If desired, the rescue apparatus according to the present invention may further comprise buoyancy means attached to the net assembly, preferably, to the above mentioned main ribs of the frame structure for maintaining the net assembly unsinkable when the net assembly is in water. The rescue apparatus thus provided with the buoyancy means is useful especially for the purpose of rescue operations at sea.

The features and advantages of a helicopter-carried rescue apparatus according to the present invention will be more clearly appreciated from the following description taken in conjunction with the accompanying drawings in which.

Figure 1:
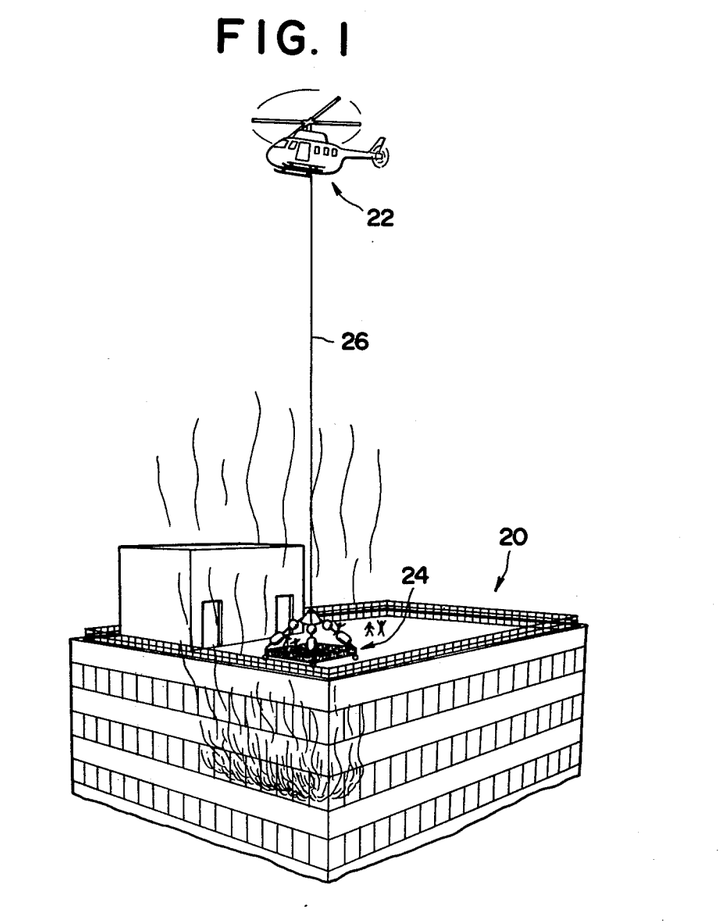
FIG. 1 is a perspective view showing a scene on which a helicopter-carried rescue apparatus provided by the present invention is in use for a rescue operation to save endangered occupants of a skyscraper building on fire.

As previously noted, a helicopter-carried rescue apparatus according to the present invention is operable as means to save shipwrecked survivors, survivors of ditched aircraft, flood victims, endangered occupants of buildings on fire, people and animals in snow storms, injured mountain climbers or, in general, lives suffering from disaster at places which are difficult of prompt access by ships, boats or ordinary land vehicles. FIG. 1 shows a scene on which such a rescue apparatus is in use for an operation to save endangered occupants of a skyscraper building 20 on fire. The rescue apparatus is carried by a helicopter 22 hovering above the building 20 and has a collapsible net assembly 24 which is suspended from the fuselage of the helicopter 22 by a rope 26 and which is shown landed in a fully expanded condition on the rooftop of the building 20. When accommodation of the endangered occupants of the building 20 is complete, the helicopter 22 is operated to ascend above the building with the expanded net assembly 24 suspended from the fuselage of the helicopter. The net assembly 24 thus loaded with the people relieved may be kept expanded until the helicopter 22 reaches the landing area where the net assembly 24 is to be unloaded, especially if the landing area is near the site of the fire or the helicopter must fly back to the site for relieving people still left in the building. To assure safety of the occupants of the net assembly, however, it is preferable that the net assembly 24 be partially collapsed to securely enclose the occupants therein as soon as the net assembly is lifted above the rooftop of the building. When the net assembly 24 is not in use, the net assembly is held in a fully collapsed condition suitable for being stably suspended from the fuselage of the helicopter 22, though not shown in FIG. 1.

The net assembly 24 of the rescue apparatus thus operative may be maneuvered directly from the helicopter 22 or, if desired, may be radio-controlled by an operator located in the neighborhood of the site. Furthermore, the rope 26 to have the net assembly 24 suspended from the helicopter 22 may be extended to any desired length from the helicopter, although there would practically be a certain limitation on such a length. If there are irregular ascending currents of air above the building on fire, the helicopter 22 per se is therefore permitted to stay in hovering flight above the building at a level where the irregular ascending currents of air could not seriously endanger the helicopter.

While a helicopter-carried rescue apparatus proposed by the present invention will thus prove useful for the saving of lives of persons and/or animals being endangered by fires or various other kinds of accidents and disasters, the present invention will be hereinafter described in detail as being embodied in a helicopter-carried rescue apparatus of the type which is specifically adapted to undertake operations to rescue lives being endangered in waters such as victims of floods or survivors from shipwrecks or ditched aircraft.

Figure 2:
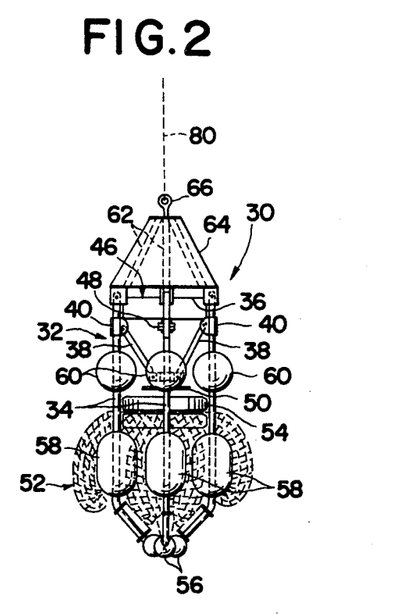
FIG. 2 is a side elevational view showing the net assembly, in a fully collapsed condition, of a preferred embodiment of a helicopter-carried rescue apparatus according to the present invention, the net assembly being shown in an upright position.
Figure 3A:
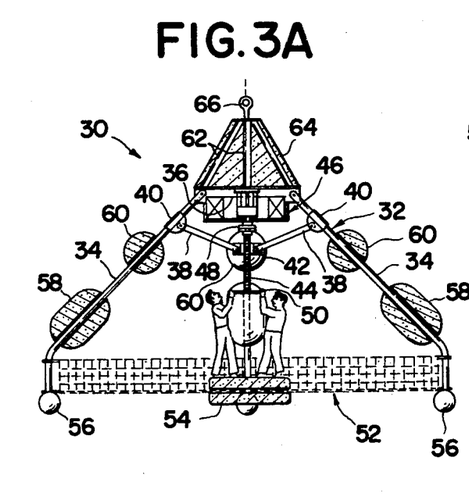
FIG. 3A is a vertical sectional view showing the fully expanded condition of the net assembly illustrated in FIG. 2.
Figure 3B:
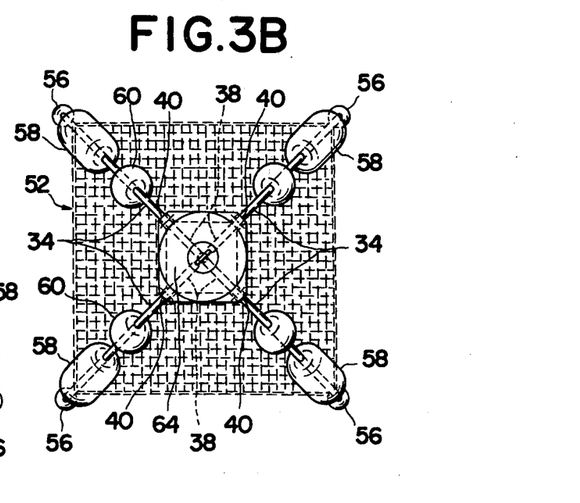
FIG. 3B is a top plan view of the net assembly illustrated in FIG. 3A.
Figure 4:
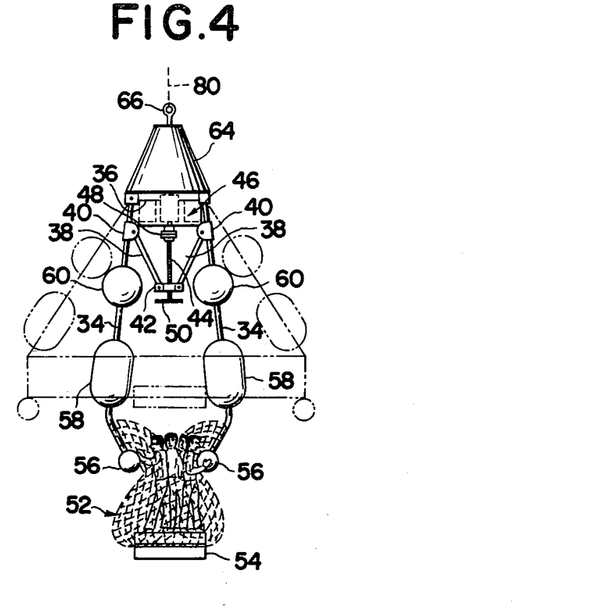
FIG. 4 is a side elevational view showing the net assembly in a partially collapsed condition accomodating therein persons who have been relieved from a danger.

Referring to FIGS. 2, 3A, 3B and 4 of the drawings, such an embodiment of the present invention is shown comprising a collapsible net assembly 30 which has a fully collapsed condition illustrated in FIG. 2, a fully expanded condition illustrated in FIGS. 3A and 3B, and a partially collapsed condition illustrated in FIG. 4. The net assembly 30 has a predetermined center axis therethrough and is in its entirety expansible and collapsible between the above mentioned fully collapsed and expanded conditions about the center axis of the net assembly 30. The net assembly 30 comprises a collapsible frame structure 32 which is expansible and collapsible in its entirety about the above mentioned center axis of the net assembly 30 between a fully collapsed condition and a fully expanded condition defining therewithin an open space having a predetermined, generally pyramidal configuration having an end plane located at or close to the lower end of the net assembly 30 when the net assembly is in an upright position having the above mentioned center axis in a vertical direction. The frame structure 32 as a whole is thus collapsible and expansible substantially symmetrically with respect to the center axis of the net assembly 30. The frame structure 32 comprises four main ribs 34 which are pivotally connected each at one end to a central support plate 36 located in the neighborhood of the above mentioned upper end of the net assembly 30 and substantially perpendicular to the center axis of the net assembly 30. The central support plate 36 has a center axis substantially coincident with the axis of the net assembly 30 and the pivoted ends of the individual main ribs are located substantially in symmetry about the center axis of the support plate 36 as will be best seen in FIG. 3B. The main ribs 34 extend radially outwardly from the central support plate 36 and away from the upper end of the net assembly 30 in the upright position thereof and are pivotable around the center axis of the net assembly between first angular positions closest to the axis of the net assembly 30 as shown in FIG. 2 and second angular positions remotest from the axis of the net assembly 30 as shown in FIG. 3A, the first angular positions of the ribs 34 being substantially parallel with the center axis of the net assembly 30. The frame structure 32 as a whole is thus in the fully collapsed condition thereof when the main ribs 34 are in the above mentioned first angular positions and is in the fully expanded condition thereof when the main ribs 34 are in the above mentioned second angular positions. Each of the main ribs 34 thus arranged has a free end portion which is inwardly bent at a suitable angle which may be such that the bent end portion becomes substantially parallel with the center axis of the net assembly 30 when the frame structure 32 is in the fully expanded condition having the main ribs 34 in the second angular positions thereof as shown in FIG. 3A. When the frame structure 32 is in the fully collapsed condition having the main ribs 34 in the first angular positions thereof, the respective bent end portions of the main ribs 34 have their extreme ends located in proximity to each other about the center axis of the net assembly 30 as will be seen from FIG. 2. While the main ribs 34 are herein assumed and shown as being four in number, the number of the main ribs 34 to construct the frame structure of the net assembly of an apparatus according to the present invention may be selected arbitrarily insofar as an ample open space can be defined by such main ribs when the frame structure is fully expanded.

The frame structure 32 shown in FIGS. 2, 3A, 3B and 4 further comprises control ribs 38 which are disposed inwardly of the main ribs 34 substantially symmetrically with respect to the center axis of the net assembly 30, as will be best seen in FIG. 3B. Each of the control ribs 38 is pivotally connected at one end to each of the main ribs 34 by means of a bracket 40 which is fixedly mounted on an intermediate portion of each main rib 34 and which is located at a suitable distance from the pivoted end of the main rib. The control ribs 38 are respectively aligned with the individual main ribs 34 in directions parallel with the center axis of the net assembly 30 and are jointly pivoted at the other ends thereof to a guide block 42 which is located substantially centrally of the ribs 34 and 38, as will be seen from FIG. 3A. The guide block 42 is formed with helical internal threads (not shown) and is in mesh with an elongated internally threaded screw rod 44 which is axially passed through the internally threaded bore in the guide block 42 and which has a center axis substantially coincident with the center axis of the net assembly 30. The screw rod 44 is rotatable about the center axis thereof and axially extends away from the support plate 36 toward the previously mentioned lower end of the net assembly 30, having a leading end at a predetermined distance from the lower end of the net assembly 30 when the frame structure 32 is fully expanded as shown in FIG. 3A. The guide block 42 is sufficiently spaced apart from the support plate 36.

Between the support plate 36 and the guide block 42 thus spaced apart from the support plate 36 is positioned a drive unit 46 which is mounted on the support plate 36. Though not shown in the drawings, the drive unit 46 includes a reversible d.c. motor, a suitable reduction gear assembly and radio-controlled switch means to start and stop the motor and alter the direction of rotation of the motor and has an output shaft connected to the above described screw rod 44 by means of a coupling 48 so that the screw rod 44 is rotatable in opposite directions about the center axis thereof. When, thus, the drive unit 46 is actuated to drive the screw rod 44 to rotate in one direction about the center axis thereof, the guide block 42 which is internally meshed with the screw rod 44 is caused to move on the screw rod in one direction parallel with the center axis of the rod 44. Likewise, the guide block 42 is caused to move on the screw rod 44 in the other direction parallel with the center axis of the screw rod 44 when the screw rod 44 is driven to rotate in the other direction about the center axis thereof by means of the drive unit 46. The guide block 42 and the screw rod 44 thus constitute means to convert the rotational power output of the drive unit 46 into linear movement of the guide block 42. When the guide block 42 is moved toward the above mentioned leading end of the screw rod 44, then the control ribs 38 are caused to incline toward the center axis of the net assembly 30 about their ends pivoted to the guide block 42. Conversely, the control ribs 38 are caused to angularly raise away from the center axis of the net assembly 30 when the guide block 42 is moved away from the leading end of the screw rod 44. The switch means incorporated in the drive unit 46 is arranged in such a manner that the screw rod 44 is capable of moving the guide block 42 between predetermined limit positions on the screw rod 44 so that the control ribs 38 are pivotable around the center axis of the net assembly 30 between first angular positions closest to the center axis of the net assembly 30 as shown in FIG. 2 and second angular positions remotest from the center axis of the net assembly 30 as shown in FIG. 3A. When the control rods 38 are thus moved to the first angular positions thereof, the main ribs 34 to which the control rods 38 are pivotally connected are moved to the previously mentioned first angular positions thereof so that the frame structure 32 as a whole assumes the fully collapsed conditions illustrated in FIG. 2. When the control rods 38 are moved to the second angular positions thereof, the main ribs 34 are also moved to the second angular positions thereof so that the frame structure 32 as a whole assumes the fully expanded condition shown in FIGS. 3A and 3B. The screw rod 44 is provided with a stop member 50 at its leading end so that the guide block 42 is prevented from being disengaged from the screw rod 44 in the event the guide block 42 happens to be moved beyond the limit position close to the leading end of the rod 44. As will be understood from the illustration of FIG. 3A, the stop member 50 also serves as a reset or handhold for persons who are accommodated in the net assembly 30 in the fully expanded condition.

The net assembly 30 further comprises a net 52 which is fastened to the inwardly bent end portions of the individual main ribs 34. The net 52 consists of a generally square-shaped major portion which has four sides each spanning neighboring two of the main ribs 34 and which is to be expanded and stretched on a place substantially perpendicular to the center axis of the net assembly 30 when the frame structure 32 is fully expanded and four side strip portions each of which spans neighboring two of the ribs 34 and which is to be expanded and stretched substantially normally to the above mentioned plane when the frame structure 32 is fully expanded, the plane being substantially coincident with the previously mentioned end plane of the generally pyramidal configuration of the open space defined by the main ribs 34 when the frame structure 32 is fully expanded, as will be seen from FIGS. 3A and 3B.

When, thus, the net assembly 30 is fully expanded in the upright position, the net 52 fully expanded and stretched between the main ribs 34 constitutes a vessel having a platform formed by the above mentioned major portion horizontally spread out at the lower end of the net assembly 30 and between the lower ends of the individual main ribs 34 and an enclosure formed by the above mentioned four side strip portions each of which is spread out between neighboring two of the ribs 34. The net 52 thus arranged is folded about the center axis of the net assembly 30 as illustrated in FIG. 2. The net assembly further comprises a plank structure 54 securely fastened to the above mentioned major portion of the net 52, spherical floats 56 respectively secured to the lower ends of the main ribs 34, cylindroid floats 58 respectively secured to lower portions of the ribs 34, and spherical floats 60 respectively secured to upper portions of the ribs 34. The plank structure 54 is constructed of a solid material floatable in water such as closed-cellular foams of synthetic resin and has major or lower and upper surfaces which are substantially perpendicular to the center axis of the net assembly 30. The plank structure 54 is thus operable as a foothold for persons accommodated within the net 52 which is fully expanded as shown in FIG. 3A or in a partially collapsed condition illustrated in FIG. 4. The plank structure 54 is preferably located centrally of the net 52. The floats 56, 58 and 60 secured to the main ribs 34 are assumed to be also constructed of a material floatable in water such as closed-cellular foams of synthetic resin but, if desired, each of the floats 56, 58 and 60 may be constituted by a hollow inflatable confinement or bag adapted to be expanded by gas under pressure which may be introduced into the confinement from an external source or may be generated by suitable gas generating means provided within the confinement or attached to the net assembly 30 though not shown in the drawings. The specific configurations of the floats 56, 58 and 60 as above described and shown in the drawings are not of critical importance and may therefore be modified or changed as desired in consideration of the desired buoyancy of the net assembly 30 and the distribution of the buoyancy in the net assembly 30. If, furthermore, a helicopter-carrier rescue apparatus according to the present invention is to be used solely for purposes other than the saving of survivors in water, the floats 56, 58 and 60 need not be provided in the net assembly and the plank structure 54 need not be constructed of a floatable material although it will be preferable to have the plank structure be formed of a light-weight material. The net assembly 30 further comprises a generally frustoconical suspension structure which is positioned atop the frame structure 32 and which comprises a suitable number of suspension rods 62 secured each at one end of the support plate 36 of the frame structure 32 and at the other end to an eyebolt 66 aligned with the center axis of the net assembly 30 and projecting upwardly when the net assembly is in the upright position as seen in FIGS. 2 and 4. As will be best seen in FIG. 3A, the suspension rods 62 are embedded in a generally frustoconical block of a suitable lightweight material such as, preferably, cellular foams of synthetic resin.

Figure 5:
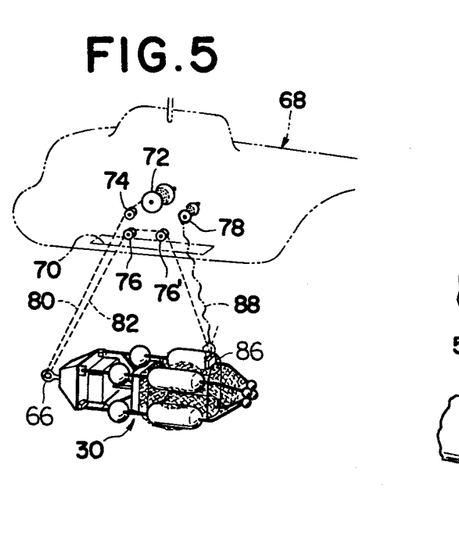
FIG. 5 is a schematic perspective view showing the whole arrangement of the helicopter-carried rescue apparatus including the net assembly illustrated in FIGS. 2, 3A and 3B, the net assembly being shown to be suspended in the fully collapsed condition and in a lying position from a helicopter in flight.
Figure 6:
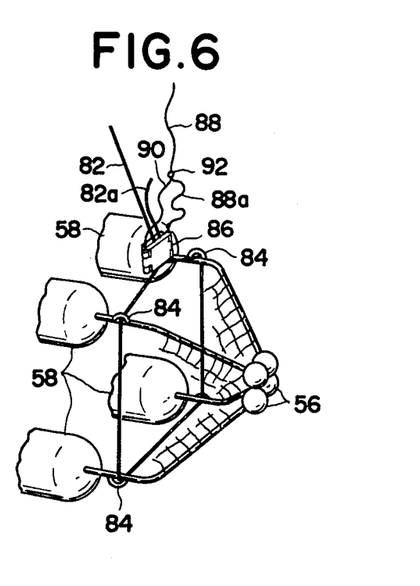
FIG. 6 is a fragmentary perspective view showing, to an enlarged scale, an end portion of the net assembly in the fully collapsed condition, the end portion being a lower end portion of the net assembly when the net assembly is in the upright position illustrated in FIG. 2.

Turning to FIG. 5 of the drawings, there is shown a condition in which the collapsible net assembly 30 which is constructed and arranged as hereinbefore described is suspended in the fully collapsed condition from a helicopter in flight, the helicopter being only partially and schematically shown at 68. The helicopter 68 has formed in a bottom portion of its fuselage an opening 70 elongated in a fore-and-aft direction of the helicopter and has suspended the net assembly 30 through the opening 70. To have the net assembly 30 suspended therefrom, the helicopter 68 is equipped with a hoisting drum 72, a hoisting pulley 74 associated with the drum 72 and located above the elongated opening 70 in the fuselage of the helicopter 68, a pair of control pulleys 76 and 76' which are located above the elongated opening 70 and spaced apart a fixed distance from each other in a fore-and-aft direction of the helicopter 68 and a control drum 78 located above the opening 70. While it is important that the axes of rotation of the control pulleys 76 and 76' be directed perpendicularly to a fore-and-aft direction of the helicopter 68, the axis of rotation of each of the drums 72 and 78 and the pulley 74 may be directed as desired. It is, however, preferable that the axes of rotation of the hoisting drum 72 and the hoisting pulley 74 be directed in parallel with each other. The hoisting drum 72 has wound thereon a lengthy flexible hoisting line which is preferably constituted by a rope 80 of preferably steel wire. The hoisting rope 80 thus leading from the hoisting drum 72 is passed on the hoisting pulley 74 and is fastened at its leading end to the previously mentioned eyebolt 66 secured to the suspension structure of the net assembly 30. The hoisting drum 72 and the hoisting pulley 74 form part of a lifting mechanism which further comprises a powdered drive unit including, for example, a motor, a reduction gear assembly and a brake system though not shown in the drawings. Such a lifting mechanism constitutes in combination with the hoisting rope 80, a hoisting system of the rescue apparatus embodying the present invention. On the other hand, the control pulleys 76 and 76' form part of a suspension mechanism for suspending the net assembly 30 independently of the above mentioned hoisting system. The suspension mechanism comprises, in addition to the control pulleys 76 and 76', a suitable drive unit capable of driving at least one of the pulleys 76 and 76' to rotate in opposite directions about the axis or axes thereof and forms part of an attitude control system of the rescue apparatus embodying the present invention. The attitude control system is adapted to vary the attitude of the net assembly 30 between the upright position having the center axis of the net assembly in a vertical direction as illustrated in FIG. 2 and a lying position having the center axis of the net assembly in an approximately horizontal direction or, more generally, substantially in parallel with a fore-and-aft direction of the helicopter 68 as shown in FIG. 5. Such an attitude control system further comprises a suspension line which is assumed to be constituted by a stranded rope 82 of preferably steel wire. The suspension rope 82 is passed on the above mentioned control pulleys 76 and 76' and extends from the two pulleys 76 and 76' toward the net assembly 30 through the opening 70 in the fuselage of the helicopter 68 when the attitude control system is in a condition having the net assembly 30 suspended from the helicopter 68 in flight. The suspension rope 82 is fastened at one end to the eyebolt 66 at the upper end of the net assembly 30 and has a free tail end portion terminating at the other end of the rope 82 as indicated at 82a in FIG. 6. The attitude control system further comprises suspension-line retaining means which consists of fittings 84 which are securely connected to lower portions of the main ribs 34, respectively, of the frame structure 32 of the net assembly 30 in such a manner as to form a hole between each of the main ribs 34 and the fitting 84 on the rib 34 as illustrated in FIG. 6. The fittings 84 are arranged substantially in parallel with a plane perpendicular to the center axis of the net assembly 30 and are located close to the inwardly bent end portions of the main ribs 34. The above mentioned tail end portion 82a of the suspension rope 82 is passed through the holes in these fittings 84 in such a manner as to form a loop girdling the individual main ribs 34 of the frame structure 32 of the net assembly 30 in the fully collapsed condition. The tail end portion 82a of the suspension line 82 thus tightly passed in a loop form on the ribs 34 is secured to a buckle 86 forming part of the above mentioned attitude control system. Generally speaking, the buckle 86 is constructed and arranged in such a manner as to have a closed condition capable of having the tail end portion 82a of the suspension rope 82 secured thereto as illustrated in FIG. 6 or more clearly in FIG. 7A and an open condition allowing the tail end portion 82a of the rope 82 to be released from the buckle 86 as shown in FIG. 7B. Thus, the suspension rope 82 is retained to both the suspension mechanism incorporated in the helicopter 68 and the net assembly 30 and is therefore capable of having the net assembly 30 suspended from the suspension mechanism in the helicopter 68 when the helicopter 68 is in flight and the buckle 86 is held in the above mentioned closed condition having the tail end portion 82a of the suspension rope 82 secured thereto. Under these conditions, the net assembly 30 in the fully collapsed condition can be held in any position between the previously mentioned upright and lying positions inclusive depending upon the relationship between the respective lengths of those portions of the suspension rope 82 which extend in opposite directions from the two control pulleys 76 and 76'. If, therefore, such lengths are approximately equal to each other, the net assembly 30 is held in the above mentioned lying position as shown in FIG. 5. If the previously mentioned drive unit connected to at least one of the control pulleys 76 and 76' is actuated to drive the pulley or pulleys in a direction to move the suspension rope 82 from one of the pulleys 76 and 76' to the other, that portion of the suspension rope 82 which is directed from one of the control pulleys 76 and 76' toward the buckle 86 becomes longer than that portion of the rope 82 which is directed from the other control pulley toward the eyebolt 66 on the net assembly 30. As the former portion of the suspension rope 82 is extended and accordingly the latter portion of the rope 82 is shortened, the net assembly 30 suspended by the rope 82 is gradually erected from the lying position, having the upper end of the assembly moved upwardly and the lower end of the assembly moved downwardly. When the difference between those portions of the suspension rope 82 which extend from the control pulleys 76 and 76' to the upper end and lower ends of the net assembly 30 reaches a certain value which depends upon the distance between the eyebolt 66 and the buckle 86 on the net assembly 30, the net assembly 30 assumes the upright position illustrated in FIG. 2. If the drive unit for the control pulleys 76 and 76' is operated to move the suspension rope 82 in the opposite direction under the condition in which the net assembly 30 is thus suspended in the upright position, then the net assembly 30 is moved to have its upper end lowered and its lower end raised until the net assembly 30 resumes the initial lying position as will be readily understood. The drive unit incorporated into the suspension mechanism including the control pulleys 76 and 76' is capable of driving at least one of the control pulleys to rotate in both directions about its axis.

If the buckle 86 is brought into the previously mentioned open condition thereof after the net assembly 30 suspended by the suspension rope 82 from the helicopter in flight has been moved into the upright position as above described, the suspension line 82 is released and is as a consequence disabled from holding the net assembly 30 suspended thereby. The weight of the net assembly 30 is therefore totally borne by the hoisting rope 80. The control drum 78 forms part of suspension line release control means which is adapted to release the buckle 86 from the closed condition. The control drum 78 has wound thereon a suspension-line release rope 88 leading from the drum 78 and having a first tail end portion constituted by an extension 88a of the rope 88 and a second tail end portion which is constituted by a control rope 90. The extension 88a and the control rope 90 thus constituting the first and second tail end portions, respectively, of the suspension line release rope 88 are shown spliced each at one end to the release rope 88 by means of a connector ring 92. As will be described more exactly, the control rope 90 is shorter than the extension 88a of the release rope 88.

Figure 7A:
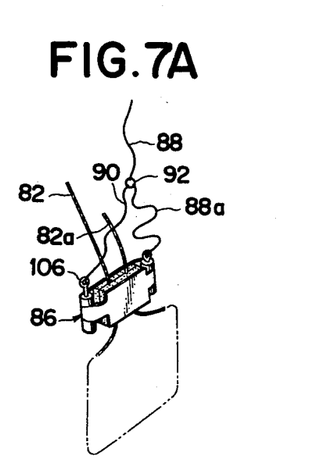
FIG. 7A is a perspective view showing, to an enlarged scale, a buckle forming part of the attitude control system of the rescue apparatus illustrated in FIG. 5, the buckle being shown to be in a closed condition operative to maintain the net assembly suspended from a helicopter by means of the attitude control system.
Figure 7B:
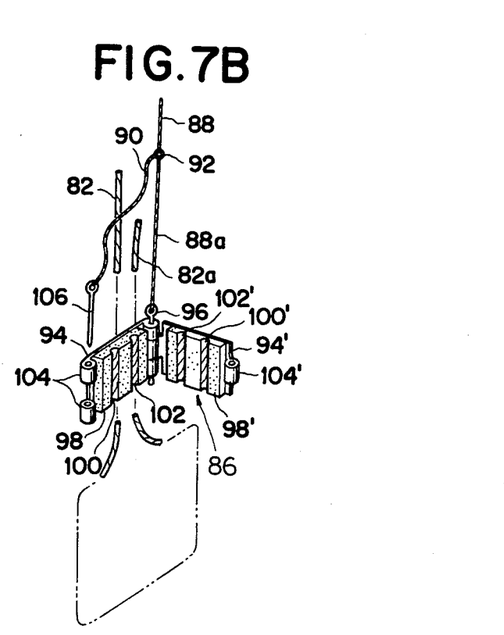
FIG. 7B is a perspective view showing the buckle in an open condition having the net assembly released from the attitude control system.

Referring to FIGS. 7A and 7B of the drawings, the buckle 86 comprises a pair of rigid clamp plates 94 and 94' which are hingedly connected together along one side end of the buckle 86 by a hinge pin 96 having a ring-shaped end portion projecting outwardly from the clamp plates 94 and 94'. The hinge pin 96 has an enlarged opposite end portion also projecting from the clamp plates 94 and 94' so that the pin is prevented from being removed from the clamp plates. The clamp plates 94 and 94' have securely attached to the respective inner faces thereof suitable thick facings 98 and 98', respectively, of a highly frictional material such as rubber. The clamp plates 94 and 94' are pivotable about the hinge pin 96 and thus have angular positions having the facings 98 and 98' in close contact with each other as shown in FIG. 7A and thereby producing the previously mentioned closed condition of the buckle 86. The facing 98 on one clamp plate 94 is formed with spaced grooves 100 and 102 which are substantially parallel with the hinged side end of the buckle 86 and likewise the facing 98' on the other clamp plate 94' is formed with spaced grooves 100' and 102' which are also substantially parallel with the hinged side end of the buckle 96, each of the grooves 100, 102, 100' and 102' being open at both ends thereof and having a substantially semicircular cross section. The grooves 100, 102, 100' and 102' are located and shaped so that the grooves 100 and 102 in one facing 98 are in registry with the grooves 100' and 102', respectively, in the other facing 98' so that two separated holes 100-100' and 102-102' each having a substantially circular cross section are formed between the facings 98 and 98' when the clamp plates 94 and 94' are held in the above mentioned angular positions having the facings 98 and 98' in close contact with each other. The cross section of each of the grooves formed in the facings 98 and 98' is so sized that each of the holes 100-100' and 102-102' thus formed between the facings has a diameter such that the tail end portion 82a of the suspension line 82 can be closely received in the hole. Furthermore, one clamp plate 94 has formed along its side edge opposite to the hinged side end of the buckle 86 two generally tubular portions 104 which are axially spaced apart from each other and which have axial bores substantially in line with each other in parallel with the hinged end of the buckle 86. Likewise, the other clamp plate 94' has formed at its side edge opposite to the hinged side end of the buckle 86 a generally tubular portion 104' which has an axial bore substantially parallel with the hinged side end of the buckle 86 and which has a length slightly smaller than the axial spacing between the tubular portions 104 of the clamp plate 94. When the clamp plates 94 and 94' are in the above mentioned angular positions thereof, the tubular portion 104' of the clamp plate 94' is located between and axially aligned with the tubular portions 104 of the clamp plate 94, as seen in FIG. 7A. The extension 88a of the above described suspension-line release rope 88 is fastened at its leading end to the ring-shaped end portion of the hinge pin 96 while the control rope 90 spliced at one end to the release rope 88 by the connector ring 92 is fastened at the other end to a locking pin 106 which is adapted to be inserted into the aligned axial bores in the tubular portions 104 and 104' of the clamp plates 94 and 94' when the clamp plates are in the angular positions having the facings 98 and 98' in close contact with each other. The locking pin 106 thus inserted into the aligned axial bores in the tubular portions 104 and 104' are retained to the portions 104 and 104' unless the pin 106 is forcefully pulled out of the bores. The suspension-line release control means including the control drum 78 is arranged in such a manner that the suspension-line release rope 88 can be freely paid out from the control drum 78 when the suspension rope 82 is being driven to move the net assembly 30 from the lying position toward the upright position thereof and accordingly the buckle 86 to which the suspension-line release rope 88 is anchored is being moved downwardly from the drum 78.

When the net assembly 30 is in the fully collapsed condition as illustrated in FIGS. 2, 5 and 6, the tail end portion 82a of the suspension rope 82 partially passed on the main ribs 34 of the frame structure 32 of the net assembly 30 and retained in a loop form to the ribs 34 by means of the fittings 84 as best seen in FIG. 6 is secured to the buckle 86 in the closed condition in such a manner that those two portions of the suspension rope 82 which merge out of the loop portion of the rope are tightly received in the two holes 100-100' and 102-102', respectively, which are formed between the facings 98 and 98' by the grooves 100 and 102 in one facing 98 and the grooves 100' and 102' in the other facing 98'. In order to prevent the suspension rope 82 from being pulled out of the buckle 86 thus held in the closed condition securing the tail end portion 82a of the rope, the suspension rope 82 may be formed with a knot at or adjacent to the leading end of the tail end portion 82a, though not shown in the drawings. Furthermore, the facings 98 and 98' may have in each of the grooves 100, 102, 100' and 102' a surface which is roughened conformingly to the lay of the stranded suspension rope 82 so that the tail end portion 82a of the suspension rope 82 is more assuredly secured to the facings 98 and 98' in the buckle 86 in the closed condition.

Figures 8, 9A:
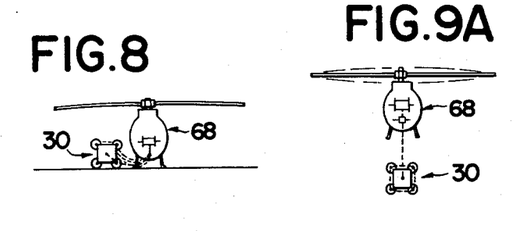
FIG. 8 is a front end view showing a helicopter equipped with the rescue apparatus embodying the present invention, the helicopter being on land with the net assembly of the rescue apparatus placed on the ground.
FIG. 9A is a front end view of the helicopter in flight with the net assembly of the rescue apparatus suspended in a lying position from the fuselage of the helicopter by means of the above mentioned attitude control system forming part of the rescue apparatus.
Figure 9B:
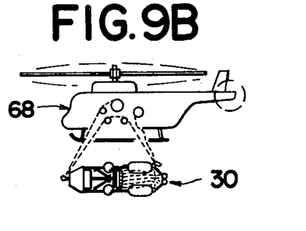
FIG. 9B is a side elevational view of the helicopter illustrated in FIG. 9A.
Figures 10, 11, 12, 13, 14A, 14B:
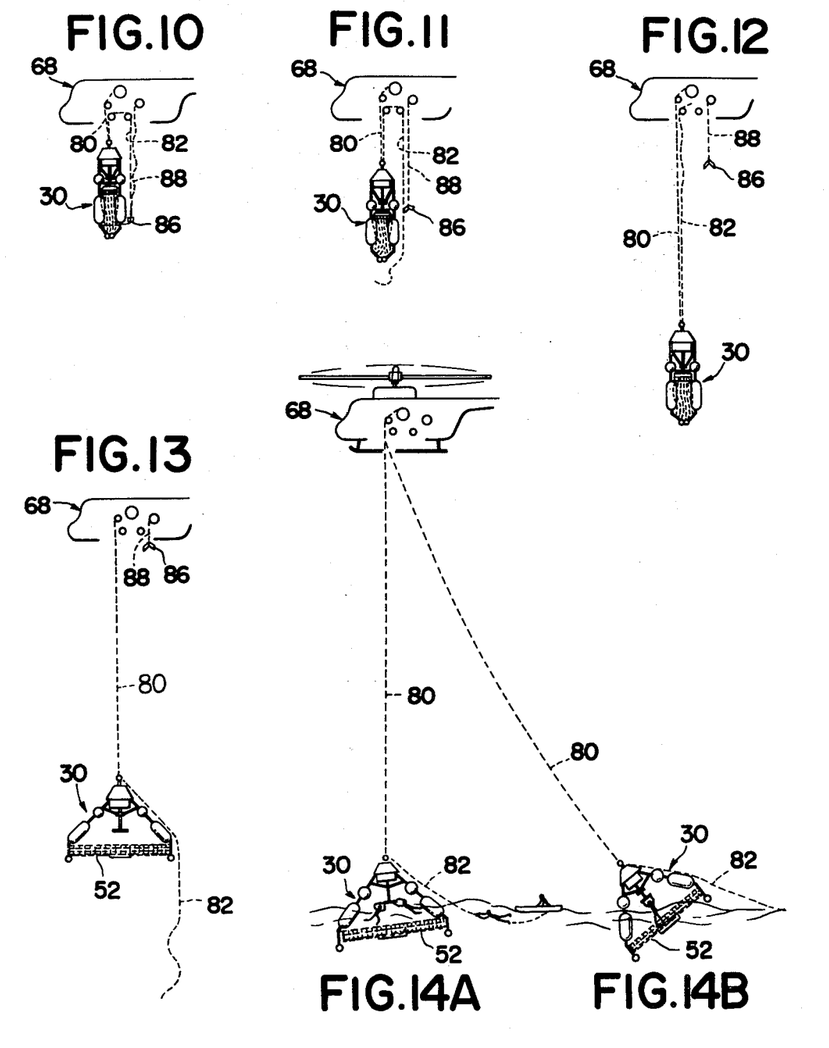
FIG. 10 is a side elevational view showing a condition in which the net assembly of the rescue apparatus is suspended in an upright position from the helicopter in flight by means of the above mentioned attitude control system.
FIG. 11 is a view similar to FIG. 10 but shows a condition in which the net assembly is released from the attitude control system and suspended from the fuselage of the helicopter by means of a hoisting system forming part of the rescue apparatus.
FIG. 12 is a side elevational view showing a condition in which the net assembly is being lowered from the helicopter.
FIG. 13 is a side elevational view showing a condition in which the net assembly is fully expanded.
FIGS. 14A and 14B are side elevational views each showing a condition in which the net assembly thus fully expanded is in operation to pick up survivors in the water.

FIG. 8 shows a condition in which the helicopter 68 on land is equipped with the net assembly 30 thus connected to the helicopter by means of the hoisting rope 80, suspension rope 82 and suspension-line release rope 88 and held in the fully collapsed condition. The suspension rope 82 in particular is adjusted to be capable of having the net assembly 30 suspended in the lying position when the helicopter 68 is in flight. When the helicopter 68 takes off and is aloft in the air, the net assembly 30 in fully collapsed condition is suspended from the fuselage of the helicopter by the suspension rope 82 and is held in the lying position as illustrated in FIGS. 9A and 9B. Under these conditions, the suspension-line release rope 88 is maintained slackened between the control drum 78 and the buckle 86 as shown in FIG. 5 so that the locking pin 106 is secured to the clamp plates 94 and 94' of the buckle 86 and holds the buckle 86 in the closed condition as shown in FIG. 7A. The hoisting rope 80 may be maintained taut or slightly slackened. With the net assembly 30 thus suspended in the lying position, the helicopter 68 rushes to the scene of a disaster which is herein assumed to be wreckage of a ship at sea. As the helicopter nears the scene, the suspension rope 82 is moved on the control pulleys 76 and 76' (FIG. 5) in the previously described manner so that the net assembly 30 in the fully collapsed condition is moved into the upright position as shown in FIG. 10. While the net assembly 30 is being thus moved from the lying position toward the upright position so that the buckle 86 is being moved downwardly below the helicopter 68, the suspension-line release rope 88 is continuously paid away from the control drum 78 and is maintained slackened until the net assembly 30 assumes the upright position illustrated in FIG. 10. During cruise of the helicopter 68 toward the scene or while the helicopter 68 which has reached the site is hovering above the scene, the suspension-line release rope 88 is pulled from the helicopter in a suitable manner as by driving the control drum 78 to rotate in a direction to haul in the rope. The suspension-line release rope 82 and accordingly the extension 88a of the rope 88 and the control rope 90 are therefore tensioned and, because of the fact that the control rope 90 is shorter than the extension 88a of the 88, the locking pin 106 tied to the control rope 90 is pulled out of the axial bores in the tubular portions 104 and 104' of the clamp plates 94 and 94' of the buckle 86 and allows the clamp plates 94 and 94' to open as illustrated in FIG. 7B. The buckle 86 being thus brought into the open conditon, the tail end portion 82a of the suspension rope 82 is allowed to be released from the buckle 86 and as a consequence the suspension rope 82 is disabled from bearing the weight of the net assembly 30. The net assembly 30 is thus suspended in the upright position below the helicopter 68 by the hoisting rope 80 partly leading from the hoisting drum 72 on the helicopter 68. The hoisting drum 72 is then allowed to rotate at a controlled velocity so that the hoisting rope 80 is extended from the drum 72 and allows the net assembly 30 to lower at a controlled velocity away from the helicopter 68 and shown in FIG. 11. As the net assembly 30 is thus moved downwardly away from the helicopter 68, the tail end portion 82a of the suspension rope 82 released from the buckle 86 which is now suspended from the helicopter 68 by the suspension-line release rope 88 is pulled from the net assembly 30 and is released from the fittings 84 (FIG. 6) on the main ribs 34 of the frame structure 32 of the net assembly 30. The suspension rope 82 is thus freed from the net assembly 30 as shown in FIG. 11 and is thereafter moved in a direction to be disengaged from the control pulleys 76 and 76' (FIG. 5) on the helicopter 68 as will be seen from FIG. 12.

While the net assembly 30 is being thus lowered away from the helicopter 68 or when the net assembly 30 is lowered a suitable distance below the helicopter 68, the drive unit 46 provided in the net assembly 30 (FIG. 2) is actuated into motion to drive the screw rod 44 to rotate about its axis in a direction to move the guide block 42 upwardly, viz., away from the stop member 50 at the leading end of the screw rod 44. As the guide block 42 is thus moved upwardly, the control ribs 38 and accordingly the main ribs 34 of the frame structure 32 of the net assembly 30 which has been held in the fully collapsed condition are caused to tilt away from the axis of the net assembly 30 until the frame structure 32 is fully expanded and as a consequence the net 52 is fully expanded and stretched between the main ribs 34, as illustrated in FIGS. 3A and 3B. While the net assembly 30 is being thus caused to expand in the air, the net assembly 30 is further lowered away from the helicopter 68 so that the suspension rope 82 is released from the control pulleys 76 and 76' on the helicopter 68 and is allowed to dangle from the eyebolt 66 on the net assembly 30 as seen in FIG. 13. After the net assembly 30 in the fully expanded condition reaches the surface of the sea in the vicinity of the shipwreck, the hoisting rope 80 may be maintained in an adequately slackened condition with the helicopter 68 hovering motionless above the scene so as to provide easy access to the net assembly 30 for swimming survivors or the survivors aboard a lifesaving boat as shown in FIG. 14A or the helicopter 68 may be operated to make a horizontal flight to tow the net assembly 30 in the water for scooping survivors out of the sea as shown in FIG. 14B. By the time the net assembly 30 is lowered in the fully expanded condition to the water, the suspension-line release rope 88 may be completely hauled in to the helicopter 68 so as to recover the buckle 86 in the helicopter as will be seen from FIGS. 11 to 13.

Upon completion of the recovery of the survivors from the scene or when the net assembly 30 is loaded to its capacity, the net assembly 30 is raised above the surface of the water and is lifted toward the helicopter 86 by means of the hoisting rope 80. In this instance, it is apparent that, as an alternative to lifting the net assembly 30 toward the helicopter 68 in hovering flight, the helicopter per se may be lowered toward the net assembly 30 left in the water while hauling in the hoisting rope 80 toward the helicopter and thereafter moved upwardly to raise the net assembly 30 above the surface of the water. When the net assembly 30 is thus suspended in the air from the helicopter 68, the helicopter 68 may cruise back to the rescue station with the net assembly 30 maintained either in the fully expanded condition as shown in FIG. 3A or in a partially collapsed conditon having the occupants of the net assembly 30 closely enclosed in the net 52 in a partially folded condition as shown in FIG. 4. The plank structure 54 secured to a central portion of the net 54 in the fully expanded and stretched condition or in the partially folded condition provides a foothold for the occupants of the net assembly 30 as will be seen from FIGS. 3A and 4. The plank structure 54 is constructed of a floatable material and thus contributes to maintaining the net assembly 30 afloat when the net assembly 30 stays in the water. Furthermore, the stop member 50 mounted on the screw rod 44 serves as a handhold for the occupants of the net assembly 30 when the net assembly 30 is in the fully expanded condition in the water or in the air, as will be seen from FIG. 3A.

Figure 15A:
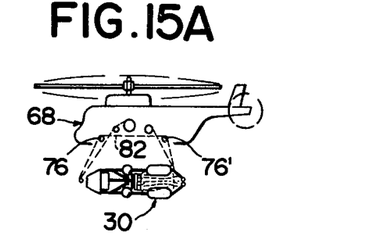
FIG. 15A is a side elevational view showing another preferred embodiment of a helicopter-carried rescue apparatus according to the present invention, the embodiment being characterized by a modified attitude control system which is capable of having the net assembly of the apparatus in a stable condition from the fuselage of a helicopter in flight, the attitude control system being schematically illustrated to be in a condition having the net assembly in the stable condition.
Figure 15B:
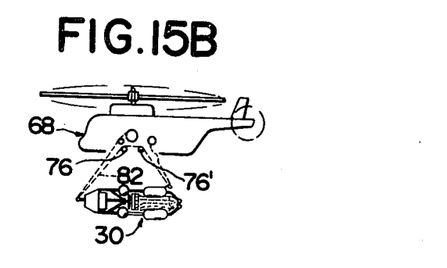
FIG. 15B is a view similar to FIG. 15A but schematically shows the attitude control system in a condition ready to have the net assembly released from the attitude control system.
Figure 16A:
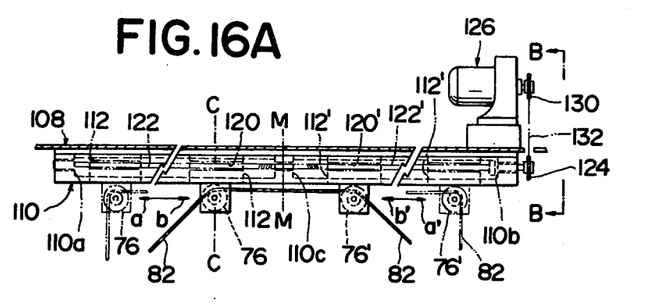
FIG. 16A is a fragmentary side elevational view showing drive and guide means forming part of the attitude control system of the rescue apparatus illustrated in FIGS. 15A and 15B.
Figure 16B:
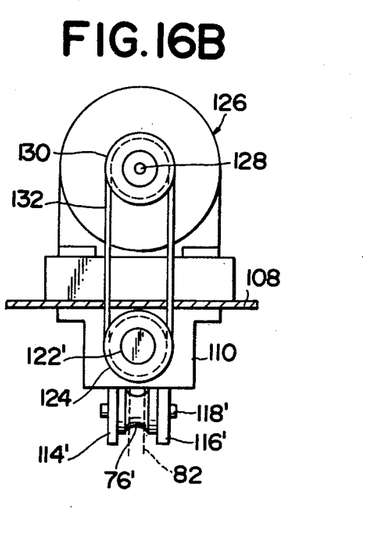
FIG. 16B is an end view of the drive and guide means as viewed in a direction indicated by arrows B in FIG. 16A.
Figure 16C:
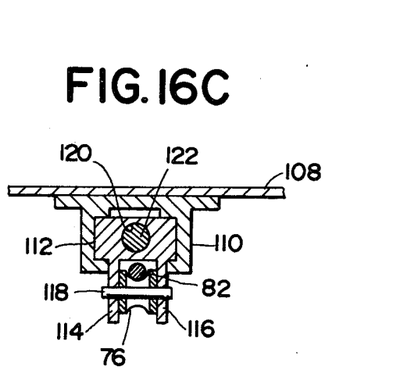
FIG. 16C is a cross sectional view taken on line C—C of FIG. 16A.

During travel of the helicopter to the site of a disaster, the net assembly 30 in fully collapsed condition is suspended in the lying position from the helicopter as has been described. If, therefore, the helicopter must make a high-speed flight toward the site of a disaster calling for emergency, it is required for the stability of flight of the helicopter to have the net assembly suspended from the helicopter in a sufficiently stable condition. It is, for this reason, preferable to enable the suspension rope 82 to span to an increased length between the control pulleys 76 and 76′ during cruise of the helicopter 68 as shown in FIG. 15A and to a reduced length between the pulleys 76 and 76′ as shown in FIG. 15B when the net assembly 30 is to be moved from the lying position to the upright position. FIGS. 16A to 16C show an arrangement in which the control pulleys 76 and 76′ for supporting the suspension rope 82 can be moved toward and away from each other so that the length of that portion of the suspension rope 82 which spans between the control pulleys 76 and 76′ is continuously variable within a certain range with the net assembly 30 kept suspended by the suspension rope 82 from the helicopter 68 in flight. The arrangement herein shown constitutes drive and guide means forming part of an attitude control system of a second embodiment of the present invention. In the description to follow, the control pulleys 76 and 76′ also forming part of the attitude control system are assumed, by way of example, to be positioned forwardly and rearwardly of each other in a fore-and-aft direction of a helicopter into which the attitude control system is to be incorporated.

Referring to FIGS. 16A, 16B and 16C of the drawings, the drive and guide means of the attitude control system of the second embodiment of the present invention comprises a generally horizontal support plate 108 having an elongated guide rail 110 securely attached to the underside of the support plate 108 by suitable fastening means such as bolts and nuts (not shown). The support plate 108 is fixedly mounted within the fuselage of a helicopter (not shown) and the guide rail 110 extends in a fore-and-aft direction of the helicopter. The guide rail 110 has cross wall portions 110a and 110b at the front and rear ends, respectively, of the guide rail 110 and an intermediate cross wall portion 110c which is located between the front and rear cross wall portions 110a and 110b and which has opposite end faces substantially equally spaced apart from the respective inner faces of the front and rear cross wall portions 110a and 110b, as indicated by broken lines in FIG. 16A. Thus, the guide rail 110 longitudinally has a longitudinal middle point which is located in the intermedite cross wall portion 110c of the guide rail 110 as indicated at M in FIG. 16A. Each of the longitudinal cavities thus formed in the guide rail 110 is assumed to have a rectangular cross section as shown in FIG. 16C. The guide rail 110 further has a bottom wall portion which is formed with front and rear longitudinal slots which are smaller in width than the above mentioned cavities and through which the front and rear longitudinal cavities, respectively, are open at the lower end of the guide rail 110. Within the front longitudinally cavity is longitudinally slidably received a front pulley carrier 112 having spaced parallel lower wall portions 114 and 116 projecting downwardly from the guide rail 110 through the front longitudinal slot in the bottom wall of the guide rail 110, as illustrated in FIG. 16C. Likewise, a rear pulley carrier 112′ is longitudinally slidably received in the rear longitudinal cavity in the guide rail 110 and has spaced parallel lower wall portions 114′ and 116′ projecting downwardly from the guide rail 110 through the rear longitudinal slot in the bottom wall portion of the guide rail 110, as will be seen from FIGS. 16A and 16B. The lower wall portions 114 and 116 of the front pulley carrier 112 are spaced apart from each other laterally of the front half of the guide rail 110 and have the grooved front control pulley 76 mounted on a shaft 118 secured to the wall portions 114 and 116 as shown in FIG. 16C so that the front control pulley 76 is rotatably about the axis of the shaft 118, viz., about an axis which is substantially perpendicular to the longitudinal direction of the guide rail 110 and which is movable together with the pulley carrier 110 longitudinally of the front half of the guide rail 110. Likewise, the lower wall portions 114′ and 116′ of the rear pulley carrier 112′ are spaced apart from each other laterally of the rear half of the guide rail 110 and have the grooved rear control pulley 76′ mounted on a shaft 118 secured to the wall portions 114′ and 116′, as shown in FIG. 16B. The suspension rope 82 is passed on the grooved front and rear control pulleys 76 and 76′ thus mounted on the front and rear pulley carriers 112 and 112′, respectively, as indicated by full and dots-and-dash lines in FIG. 16A.

The pulley carrier 112 and 112′ are formed with internally threaded axial bores 120 and 120′, respectively, having respective center axes which are substantially in line with each other in a longitudinal direction of the elongated guide rail 110, as will be seen from FIG. 16A. The internal helical threads thus formed in each of the pulley carriers 112 and 112′ are such that the directions of the helices of the respective internal helical threads of the front and rear pulley carriers are opposite to each other. Externally threaded drive shafts 122 and 122′ passed through these internally threaded axial bores 120 and 120′, respectively, in the front and rear pulley carriers 112 and 112′ and are in mesh with the respective internal threads of the front and rear pulley carriers 112 and 112′. Thus, the directions of the helices of the external helical threads of the front and rear drive shafts 122 and 122′ are also opposite to each other as indicated in part in the vicinity of the intermediate cross wall portion 110c of the guide rail 110 in FIG. 16A. The drive shafts 122 and 122′ are rotatable about axes which are substantially coincident with the center axes of the internally threaded axis bores 120 and 120′, respectively, in the pulley carriers 110 and 110′and which are accordingly in line with each other. When, thus, the front and rear drive shafts 122 and 122′ are driven to rotate as a single unit in one predetermined direction about their respective axes, the front and rear pulley carriers 112 and 112′ are moved along the guide rail 110 away from the middle point M of the guide rail as indicated by arrows a and a′, respectively, in FIG. 16A. When the drive shafts 122 and 122′ are driven to rotate as a single unit in the other direction about their respective axes, then the front and rear pulley carriers 112 and 112′ are moved along the guide rail 110 toward the middle point M of the guide rail as indicated by arrows b and b′, respectively, in FIG. 16A. The front control pulley 76 is thus movable between predetermined foremost and rearmost longitudinal positions close to the front and intermediate cross wall portions 110a and 110c, respectively, of the guide rail 110 as indicated by dots-and-dash lines in FIG. 16A, while the rear control pulley 76′ is movable between predetermined rearmost and foremost longitudinal positions close to the rear and intermediate cross wall portions 110b and 110c, respectively, of the guide rail 110 as indicated by full lines in FIG. 16A. The front and rear drive shafts 122 and 122′ are journalled at their respective outer axial ends in the front and rear cross wall portions 110a and 110b, respectively, of the guide rail 110 and are integrally connected together at their respective inner axial ends through an axial bore formed in the intermediate cross wall portion 110c of the guide rail 110, as shown in FIG. 16A. The rear drive shaft 122' has a rearward extension projecting out of the rear cross wall portion 110b of the guide rail 110 as shown in FIGS. 16A and 16B. The rearward extension of the rear drive shaft 122' has fixedly mounted thereon a grooved pulley 124 which is thus rotatable about an axis which is in line with the aligned axes of rotation of the drive shafts 122 and 122'.

The drive and guide means illustrated in FIGS. 16A to 16C further comprises a drive unit 126 which is mounted on the upper face of the support plate 108 as shown in FIGS. 16A and 16B. The drive unit 126 may be composed of a reversible d.c. motor and a reduction gear assembly (not shown) and has an output shaft 128 projecting above and substantially in parallel with the above mentioned rearward extension of the rear drive shaft 122'. A grooved pulley 130 is securely connected to the output shaft 128 of the drive unit 126 and an endless belt 132 is passed round the pulleys 124 and 130 as best seen in FIG. 16B.

When thus, the drive unit 126 is operated to have its output shaft 128 rotated in one direction about the center axis thereof, the rotational motion of the shaft 128 is transmitted by the pulley 130, endless belt 130 and pulley 124 to the rear drive shaft 122' so that the front and rear drive shafts 122 and 122' integral with each other are driven to rotate as a single unit in one predetermined direction about their respective axes and cause the front and rear pulley carriers 112 and 112' to longitudinally move along the guide rail 110 away from the middle point M of the guide rail 110 as indicated by arrows a and a' in FIG. 16A. The front and rear control pulleys 76 and 76' supported on the pulley carriers 112 and 112', respectively, are therefore moved away from each other in a longitudinal direction of the guide rail 110 until the front and rear pulley carriers 112 and 112' reach their respective foremost and rearmost longitudinal positions on the guide rail 110 as indicated by the dots and-dash lines in FIG. 16A. FIG. 15A shows a condition in which the collapsible net assembly 30 forming part of the second embodiment of the present invention is suspended in a lying position by the suspension rope 82 supported by the front and rear control pulleys 76 and 76' which are held in these longitudinal positions remotest from each other on the guide rail 110 mounted on the helicopter 68 in flight toward the site of a disaster. When the helicopter 68 nears the site, the drive unit 126 of the drive and guide means illustrated in FIGS. 16A to 16C is operated so that the front and rear drive shafts 122 and 122' are driven to rotate in the other direction about their respective axes and cause the front and rear pullet carriers 112 and 112' to move along the guide rail 110 toward the middle point M of the guide rail 110 as indicated by arrows b and b', respectively, in FIG. 16C. As a consequence, the front and rear control pulleys 76 and 76' are moved toward each other in the longitudinal direction of the guide rail 110 unitl the front and rear pulley carriers 112 and 112' reach their respective rearmost and foremost longitudinal positions on the guide rail 110 as indicated by the full lines in FIG. 16C. FIG. 15C illustrates a condition in which the callapsible net assembly 30 is suspended in a lying position by the suspension rope 82 supported by the front and rear control pulleys 76 and 76' which are thus held in the positions closest to each other on the guide rail 110.

While the drive shafts 122 and 122' of the drive and guide means illustrated in FIGS. 16A to 16C have been described to be integrally connected together and driven by single drive unit which is operatively connected to the unitary construction of the shafts 122 and 122', the front and rear drive shafts may be constructed separately of each other and driven by two separate drive unit which are exclusively associated with the shafts, respectively, and which are arranged to operate either in synchronism with or independently of each other. In this instance, the internal threads of the pulley carriers and accordingly the external threads of the drive shafts may be formed so that the respective internal threads of the front and rear pulley carriers and accordingly the respective external threads of the front and rear drive shafts are helically turned either in opposite directions or in the same directions. For varying the distance between the front and rear pulley carriers mounted on the drive shafts having the external threads which are thus helically turned in the directions opposite to each other, the drive respective drive units for the drive shafts should be operated to drive the shafts to simultaneously rotate in the same direction as in the arrangement of FIGS. 16A to 16C. Where, however, the external threads of the front and rear drive shafts are helically turned in the same directions, the distance between the front and rear pulley carriers on such drive shafts is varied by operating the respective drive units for the shafts in such a manner as to drive the shafts to rotate simultaneously in the directions opposite to each other. If, furthermore, the front and rear drive shafts which are constructed separately of each other are driven to rotate in such a manner that both of the front and rear pulley carriers are moved simultaneously in the same direction, viz., forwardly or rearwardly relative to the helicopter on which the drive shafts are installed, the net assembly suspended from the helicopter can be moved in a fore-and-aft direction relative to the helicopter in flight. The arrangement using the separate front and rear drive shafts is, thus, operable not only for the purpose of varying the distance between the front and rear control pulleys without varying the fore-and-aft position of the net assembly relative to the helicopter but for the purpose of moving the net assembly forwardly or rearwardly relative to the helicopter.

Figure 17:
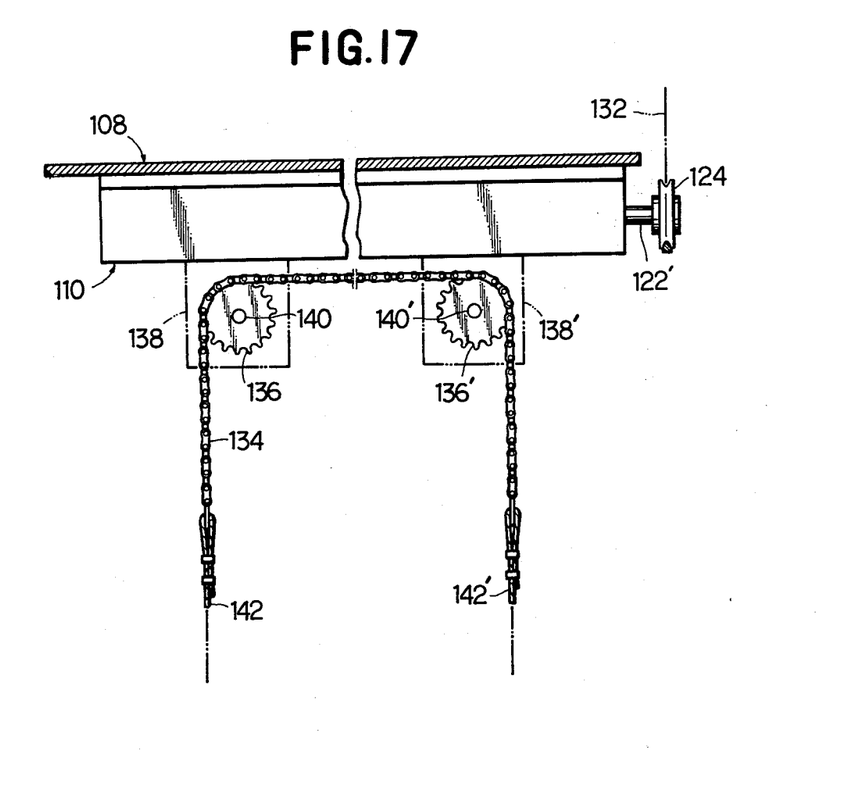
FIG. 17 is a fragmentary side elevational view showing a modification of the drive and guide means illustrated in FIGS. 16A to 16C.

In order to enable the suspension line to be moved more assuredly through the suspension mechanism with the net assembly 30 held in a suspended condition, the suspension line may comprise a roller chain constituting at least an intermediate portion of the suspension line and engaging at least one sprocket wheel which is provided in lieu of at least one of the control pulleys 76 and 76' of the suspension mechanism of each of the hereinbefore described embodiments. FIG. 17 shows an example of such a chain and sprocket arrangement. In the arrangement shown herein, the suspension line is constituted in part by a roller chain 134 having a suitable predetermined length and engaging front and rear sprocket wheels 136 and 136' mounted for rotation about their respective center axes on the front and rear sprocket carriers 138 and 138' by means of shafts 140 and 140', respectively. The sprocket carriers 138 and 138' and according to shafts 140 and 140' are constructed and arranged similarly to the pulley carriers 112 and 112' and shafts 118 and 118', respectively, of the suspension mechanism illustrated in FIGS. 16A to 16B. The roller chain 134 is spliced at its opposite ends to stranded ropes 142 and 142' one of which is securely anchored at its leading end to the eyebolt 66 of the suspension structure of the net assembly 30 (FIG. 5) and the other of which has a leading end portion passed through the fittings 84 on the main ribs 34 of the net assembly 30 (FIG. 6) and retained to the buckle 86. The length of the roller chain 134 is such that the cahin can be maintained in engagement with the sprocket wheels 136 and 136' when sprocket carriers 138 and 138' are moved into positions remotest from each other on the guide rail 110 as shown in FIG. 17.

While only two substantially different embodiments of the present invention have hereinbefore been described with reference to the accompanying drawings, such embodiments are merely illustrative of the basic concept of the present invention and, for this reason, the embodiments herein shown can be varied or modified in numerous manners if desired and to meet the individual requirements of rescue tasks to be performed by the use of helicopters. While, furthermore, the helicopters equipped with the embodiments of the present invention have been exemplified in a single-rotor-type helicopter, this is merely by way of example and, thus, a helicopter-carried rescue apparatus according to the present invention may be installed on any type of helicopters.

What is claimed is:

1. A helicopter-carried rescue apparatus comprising a collapsible net assembly having an axis therethrough and, first and second axial ends, said assembly being biased by its own weight to have an upright position with said axis in a vertical direction and said first and second axial ends disposed at the upper and lower ends, respectively, of the net assembly, said net assembly including: a flexible net; a collapsible frame structure having said net fitted thereto, said net being collapsible about said axis between a fully collapsed condition having said net folded about said axis and a fully expanded condition having said net spread out about said axis, the net spread out having a portion stretched on a plane substantially perpendicular to said axis and proximate to said second axial end of the net assembly, and a hoisting system having a lifting mechanism for installation on a helicopter, said mechanism having at least one flexible hoisting line fastened at one end to said lifting mechanism and at the other end to said net assembly, for suspending the net assembly in said upright position below the helicopter during flight, said frame structure being defined by a support member located in proximity to said first axial end of the net assembly, substantially perpendicular to said axis of the net assembly and having an axis substantially coincident with the axis of the net assembly; a plurality of main ribs pivotally connected each at one end to said support member, extending radially outwardly from the support member and away from said first axial end of the net assembly, the individual main ribs being pivotable around said axis of the net assembly between first angular positions closest to the axis of the net assembly and second angular positions remotest from the axis of the net assembly, the frame structure being in the fully collapsed condition thereof when said main ribs are in said first angular positions and being in the fully expanded condition when the main ribs are in said second angular positions; externally threaded screw rod rotatably disposed about a center axis substantially coincident with said axis of the net assembly and which axially extends away from said support member toward said second axial end of the net assembly, said screw rod having a leading end at a predetermined distance from said second axial end of the net assembly when the frame is in the fully expanded condition thereof; an internally threaded guide member which is in mesh with said screw rod being movable on the screw rod in opposite directions parallel with the center axis of the screw rod as the screw rod is rotated in opposite directions about the center axis thereof; control ribs extending radially outwardly from said guide member, each pivotally connected at one end to the guide member and at the other end, to an intermediate portion of each of said main ribs, the individual control ribs being pivotable around the axis of the net assembly between first angular positions closest to said axis of the net assembly and second angular positions remotest from the axis of the net assembly and being in the first angular positions thereof, when the guide member is in a position closest to said leading end of the screw rod and in the second angular positions thereof when the guide member is in a position remotest from the leading end of the screw rod; and drive means mounted on said support member being operatively connected to said screw rod, the drive means being operative to drive the screw rod to rotate in either direction about the center axis as the rod drives said guide member to move in either direction along the screw rod.

2. A helicopter-carried rescue apparatus as set forth in claim 1, in which said net assembly further comprises buoyancy means secured to said net assembly for maintaining the net assembly unsinkable in water.

3. A helicopter-carried rescue apparatus as set forth in claim 2, in which said buoyancy means comprises a plurality of floats which are secured to said frame structure and said net.

4. A helicopter-carried rescue apparatus as set forth in claim 3, in which said floats are arranged substantially symmetrically with respect to said axis of the net assembly.

5. A helicopter-carried rescue apparatus as set forth in claim 1, in which said net assembly further comprises a plank structure secured to said portion of said net and having substantially flat major surfaces which are substantially perpendicular to said axis of the net assembly when the net is fully expanded and stretched.

6. A helicopter-carried rescue apparatus as set forth in claim 5, in which said plank structure is constructed of a material floatable in water.

7. A helicopter-carried rescue apparatus as set forth in claim 1, further comprising an attitude control system capable of having said net asssembly suspended below said helicopter independently of said hoisting system and varying the attitude of the net assembly between said upright position and a lying position having said axis of the net assembly in a substantially horizontal direction when the net assembly is suspended by means of the attitude control system.

8. A helicopter-carried rescue apparatus as set forth in claim 7, in which said attitude control system comprises a flexible suspension line which is fastened at one end to the first axial end of said net assembly and which has a free tail end portion terminating at the other end of said suspension line, a suspension mechanism for installation on said helicopter and capable of having the suspension line retained thereto while allowing the net assembly to assume any position between said upright and lying positions, suspension-line retaining means fast on the net assembly and located in the neighborhood of said second axial end of the net assembly for being capable of retaining said tail end portion of the suspension line to the net assembly, buckle means having a closed condition capable of having said tail end portion of the suspension line secured thereto and accordingly holding the tail portion to said suspension-line retaining means on the net assembly when the net assembly is in the fully collapsed condition thereof and an open condition allowing said tail end portion of the suspension line to be released from the buckle means and accordingly from said suspension-line retaining means, said suspension line being supported by said suspension mechanism and accordingly the net assembly being suspended from the suspension mechanism by means of the suspension line independently of said hoising system when the helicopter is in flight and the buckle means is in said closed condition having said tail end portion of the suspension line secured to the buckle means, suspension-line release control means for installation on said helicopter, and a flexible suspension-line release line which is fastened at one end to said release control means and at the other end to said buckle means and which is operable to allow the buckle means to be in said closed condition thereof when the release line is slackened and in said open condition thereof when the release line is taut, said suspension-line release control means being operable to maintain the suspension-line release line slackened or to pull the release line away from the buckle means toward said control means for making the release line taut.

9. A helicopter-carried rescue apparatus as set forth in claim 8, in which said suspension-line release line has a first branch end portion fastened to said buckle means and a second branch end portion releasably anchored to the buckle means and operable to allow the buckle means to be in said closed condition thereof when the second branch end portion is slackened and in said open condition thereof when the second branch end portion is taut, the second branch end portion being slackened and taut when the suspension-line release line is slackened and taut, respectively.

10. A helicopter-carried rescue apparatus as set forth in claim 9, wherein: said buckle means comprises a buckle defined by a pair of clamp plates; said clamp plates being hingedly connected together along one side end of the buckle; a frictional facing securely attached to the inner face of each of said clamp plates; being formed with at least two spaced grooves each open at both ends, the clamp plates being pivotable about said side end of the buckle and having angular positions in which the respective facings on the clamp plates are in close contact with each other for producing said closed condition of the buckle means; the grooves in the facing on one of said clamp plates being respectively in registry with the grooves in the facing on the other clamp plate to thereby form between the facings, at least two separate holes each of which is open at both ends thereof and capable of securely passing said tail end portion of said suspension line therethrough, when said clamp plates are in said angular positions thereof; and locking means having an operative condition for holding said clamp plates in said angular positions thereof and an inoperative condition, allowing said clamp plates to turn away from each other about said side of the buckle for producing said open condition of said buckle means, said first branch end portion of said suspension-line release line being securely fastened at its leading end to at least one of said clamp plates and said second branch end portion of the suspension-line release line being connected at its leading end to said locking means, the locking means being in said operative condition when the second branch end portion is slackened and in said inoperative condition when the second brand end portion is taut.

11. A helicopter-carried rescue apparatus as set forth in claim 10, in which said locking means comprises at least one tubular element which is fast on each of said clamp plates and which is formed with a bore, the bores in the respective tubular elements on the two clamp plates being substantially in alignment with each other when said clamp plates are in said angular positions thereof, and an elongated locking element capable of being inserted into the aligned bores in said tubular elements when said clamp plates are in said angular positions thereof, said second branch end portion of said suspension-line release line being fastened at its leading end to said locking element for allowing the locking element to stay in said aligned bores when the second branch end portion is slackened and forcing the locking element to be pulled out of the aligned bores when the second branch end portion is taut.

12. A helicopter-carried rescue apparatus as set forth in claim 10, in which said second branch end portion of said suspension-line release line consists of a stranded rope and in which each of the facings on said clamp plates has in the grooves therein surface portions which are roughened conformingly to the lay of said rope.

13. A helicopter-carried rescue apparatus as set forth in claim 10, in which said grooves in the facing of each of said clamp plates are substantially parallel with each other.

14. A helicopter-carried rescue apparatus as set forth in claim 13, in which said grooves in each of said facings are substantially parallel with said side end of said buckle.

15. A helicopter-carried rescue apparatus as set forth in claim 14, in which said bores in said tubular elements on said clamp plates are substantially parallel with said side end of said buckle.

16. A helicopter-carried rescue apparatus as set forth in claim 8, in which said suspension mechanism comprises a pair of pulleys which are capable of having said suspension line passed thereon and which are movable toward and away from each other in a predetermined direction along a portion of the fuselage of said helicopter for being capable of continuously varying the length of that portion of the suspension line which is passed between said pulleys, and drive and guide means for driving the pulleys to move toward and away from each other in said predetermined direction.

17. A helicopter-carried rescue apparatus as set forth in claim 16, in which said drive and guide means comprises a pulley carrier supporting each of said pulleys, an elongated guide rail for installation on said helicopter and supporting the respective pulley carriers supporting said pulleys, each of the pulley carriers being movable in a longitudinal direction of the guide rail and each of the pulleys having an axis of rotation substantially perpendicular to the direction in which the pulley carrier supporting the pulley is movable on the guide rail, the pulley carriers being formed with internally threaded bores which are substantially in line with each other in a longitudinal direction of the guide rail, a pair of externally threaded drive shafts respectively passed through said bores and in mesh with the respective internal threads of the pulley carriers, and drive means connected to said drive shafts and operative to drive the drive shafts to rotate about their respective axes, and pulley carriers being moved toward each other along said guide rail when each of the drive shafts is driven by said drive means to rotate in one direction about its axis and being moved away from each other along said guide rail when each of the drive shafts is driven by said drive means to rotate in the other direction about its axis.

18. A helicopter-carried rescue apparatus as set forth in claim 17, in which the directions of the helices of the respective internal threads of said pulley carriers are opposite to each other and accordingly the directions of the helices of the respective external threads of said drive shafts are opposite to each other, said drive means including a single drive unit to which said drive shafts are jointly connected and are operable to rotate as a single unit about their respective axes.

19. A helicopter-carried rescue apparatus as set forth in claim 18, in which said net assembly further includes buoyancy means secured to said frame structure for maintaining the net assembly unsinkable in water.

20. A helicopter-carried rescue apparatus as set forth in claim 19, in which said buoyancy means comprises a plurality of floats which are secured to said main ribs.

21. A helicopter-carried rescue apparatus as set forth in claim 20, in which said floats are arranged substantially in symmetry with respect to said axis of said net assembly.

22. A helicopter-carried rescue apparatus as set forth in claim 20, in which each of said floats is constructed of a solid block of closed-cellular foams of synthetic resin.

23. A helicopter-carried rescue apparatus as set forth in claim 20, in which each of said floats is constructed of a hollow inflatable confinement.

24. A helicopter-carried rescue apparatus as set forth in claim 20, in which said net assembly further includes a plank structure secured to said portion of said net an having substantially flat major surfaces which are substantially perpendicular to said axis of the net assembly when the net is fully stretched.

25. A helicopter-carried rescue apparatus as set forth in claim 24, in which said plank structure has a major portion constructed of a floatable material.

26. A helicopter-carried rescue apparatus as set forth in claim 25, in which said floatable material consists of closed cellular foams of sythetic resin.

27. A helicopter-carried rescue apparatus as set forth in claim 25, in which said plank structure is located substantially centrally of said portion of said net.

28. A helicopter-carried rescue apparatus as set forth in claim 18, in which said net assembly further includes a stop member secured to said screw rod in proximity to said leading end of the screw rod.

29. A helicopter-carried rescue apparatus as set forth in claim 8, in which said suspension line comprises a roller chain constituting at least an intermediate portion of the suspension line and in which said suspension mechanism comprises at least one sprocket wheel with which said roller chain is engageable, said roller chain having a length capable of maintaining the roller chain in engagement with said sprocket wheel when said suspension line is in a condition suspending said net assembly in a position variable between said upright and lying positions inclusive.

* * * * *